US011361195B2

United States Patent
Kafai et al.

(10) Patent No.: US 11,361,195 B2
(45) Date of Patent: Jun. 14, 2022

(54) INCREMENTAL UPDATE OF A NEIGHBOR GRAPH VIA AN ORTHOGONAL TRANSFORM BASED INDEXING

(71) Applicant: Hewlett Packard Enterprise Development LP, Houston, TX (US)

(72) Inventors: Mehran Kafai, Redwood City, CA (US); Kyriaki Dimitriadou, Palo Alto, CA (US); April Slayden Mitchell, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 827 days.

(21) Appl. No.: 15/768,539

(22) PCT Filed: Oct. 16, 2015

(86) PCT No.: PCT/US2015/055883
§ 371 (c)(1),
(2) Date: Apr. 14, 2018

(87) PCT Pub. No.: WO2017/065795
PCT Pub. Date: Apr. 20, 2017

(65) Prior Publication Data
US 2018/0285693 A1 Oct. 4, 2018

(51) Int. Cl.
*G06F 16/00* (2019.01)
*G06K 9/62* (2022.01)
(Continued)

(52) U.S. Cl.
CPC ......... *G06K 9/6276* (2013.01); *G06F 16/285* (2019.01); *G06F 16/9014* (2019.01);
(Continued)

(58) Field of Classification Search
CPC .................................................. G06F 16/9024
(Continued)

(56) References Cited

U.S. PATENT DOCUMENTS 6,501,788 B1 * 12/2002 Wang .................. H04B 1/7103
375/148
7,903,306 B2 * 3/2011 Cho ....................... H04N 19/61
358/539
(Continued)

FOREIGN PATENT DOCUMENTS

WO    WO-2013129580    9/2013

OTHER PUBLICATIONS

Aoyama, K., et al.; "Fast Approximate Similarity Search Based on Degree-reduced Neighborhood Graphs"; Aug. 21-24, 2011; 9 Pgs.
(Continued)

*Primary Examiner* — Monica M Pyo
(74) *Attorney, Agent, or Firm* — Sheppard Mullin Richter & Hampton LLP (57) ABSTRACT

Incremental update of a neighbor graph via an orthogonal transform based indexing is disclosed. One example is a system including a hash transform module to apply an orthogonal transform to a data object in a data stream, and to associate the data object with a collection of ordered hash positions. An indexing module retrieves an index of ordered key positions, where each key position is indicative of data objects in the data stream that have a hash position at the key position. A neighbor determination module determines a ranked collection of neighbors for the data object in a neighbor graph, where the ranking is based on the index. A graph update module incrementally updates the neighbor graph by including the data object as a neighbor for a selected sub-plurality of data objects in the ranked collection.

18 Claims, 6 Drawing Sheets

(51) Int. Cl.
  *G06F 16/901* (2019.01)
  *G06F 16/903* (2019.01)
  *G06F 17/10* (2006.01)
  *G06F 16/28* (2019.01)
  *G06F 17/14* (2006.01)

(52) U.S. Cl.
  CPC .... *G06F 16/9024* (2019.01); *G06F 16/90335* (2019.01); *G06F 17/10* (2013.01); *G06F 17/147* (2013.01)

(58) Field of Classification Search
  USPC .......................................................... 707/798
  See application file for complete search history.

(56) References Cited

U.S. PATENT DOCUMENTS

| | | | |
|---|---|---|---|
| 8,705,870 B2 | 4/2014 | Wang et al. | |
| 8,832,139 B2* | 9/2014 | Selly | G16B 30/00 707/769 |
| 9,025,822 B2* | 5/2015 | Jin | G06K 9/4642 382/103 |
| 9,062,985 B2 | 6/2015 | Demiryurek et al. | |
| 9,489,401 B1* | 11/2016 | Garcia | G06F 16/5846 |
| 2007/0050566 A1 | 3/2007 | Lang et al. | |
| 2008/0033897 A1 | 2/2008 | Lloyd | |
| 2013/0031059 A1* | 1/2013 | Ravikumar | G06F 16/325 707/667 |
| 2013/0151536 A1 | 6/2013 | Akoglu et al. | |
| 2013/0230255 A1* | 9/2013 | Wang | G06F 16/583 382/201 |
| 2014/0046593 A1 | 2/2014 | Demiryurek et al. | |
| 2014/0258295 A1 | 9/2014 | Wang et al. | |
| 2014/0355899 A1* | 12/2014 | Jin | G06T 5/002 382/254 |
| 2017/0091240 A1* | 3/2017 | Yu | G06F 16/3331 |
| 2017/0091655 A1* | 3/2017 | Lin | G06N 20/00 |

OTHER PUBLICATIONS

PCT International Search Report cited in PCT/US2015/055883; dated Jul. 15, 2016; 3 pages.

Zhang, Y.M, et al.; "Fast kNN Graph Construction with Locality"; Jun. 28, 2013; 15 pages.

Chen et al., "Fast Approximate kNN Graph Construction for High Dimensional Data via Recursive Lanczos Bisection", Journal of Machine Learning Research, vol. 10, 2009, pp. 1989-2012.

Connor et al., "Fast Construction of k-Nearest Neighbor Graphs for Point Clouds", IEEE Transactions on Visualization and Computer Graphics, 2009, pp. 1-11.

Dong et al., "Efficient K-nearest Neighbor Graph Construction for Generic Similarity Measures", Proceedings of the 20th International Conference on World Wide Web, 2011, pp. 577-586.

Paredes et al., "Practical Construction of k-Nearest Neighbor Graphs in Metric Spaces", WEA'06 Proceedings of the 5th international conference on Experimental Algorithms, 2006, 12 pages.

* cited by examiner

INCREMENTAL UPDATE OF A NEIGHBOR GRAPH VIA AN ORTHOGONAL TRANSFORM BASED INDEXING

BACKGROUND

Big data is data that generally exceeds the processing capacity of conventional systems. Methods for analyzing big data are of great interest in many applications, including similarity search, collaborative filtering, data compression, retrieval, clustering, and classification. Graphs may be used to represent data. For example, a nearest neighbor graph may connect each data object to data objects that are nearest (or most similar) to the data object.

DETAILED DESCRIPTION

Big data may be defined as data that exceeds the processing capacity of conventional systems. Methods for analyzing such data continue to grow in prominence. Graph techniques are often applied to represent and efficiently analyze big data. One such graph representation is a k-nearest neighbor ("kNN") graph. A kNN graph comprises of nodes that are data objects, and edges that connect a data object to k proximal data objects, where proximity between data objects may be based on an appropriate similarity.

A kNN graph may help represent and analyze large volumes of data by revealing nearest matches to any data object. kNN graphs are extensively used in areas such as machine learning, data mining, computer vision and image processing. Applications that utilize kNN graphs include but are not limited to similarity search, collaborative filtering, data compression, retrieval, clustering, and classification. For example, large Enterprise data warehousing applications may use collaborative filtering to sort and/or search content relevant to a particular topic thread. As another example, an online retailer may use a similarity search to make product recommendations based on a particular customer's recent purchases. Also, for example, a security firm may use nearest neighbor matches to identify known persons from live video feeds.

Generally, the challenge of these applications is to maintain performance efficiency as data grows. In some examples, the data may be large volumes of rapidly streaming data, adding to the challenge of maintaining both speed and efficiency. For kNN graphs, costs associated with graph construction, for example in terms of time and resources, are considerably high for large data sets. Additionally, as a kNN graph is continually updated based on incoming data, such costs may increase considerably.

Nearest neighbor graph constructions generally use various methods such as recursive Lanczos bisection, Morton ordering, or local search. Generally, such approaches construct the nearest neighbor graph by comparing data objects directly. Approximate algorithms such as locality sensitive hashing may reduce the comparison space, but data objects in the smaller comparison space are compared directly to each other. This is generally not effective for high velocity, high volume data streams. Some hash-based techniques may be used to update the kNN graph, but these hashing techniques often display anomalies due to a distance metric distortion.

Accordingly, there is a need for a kNN graph construction and updating process that may compute and update nearest neighbors in an efficient manner, especially for high velocity, high volume data streams. As described herein, an orthogonal transform based indexing system may be used to efficiently compute the nearest neighbors of a data object in a kNN graph, and then use a local search to update the data objects in the kNN graph that are likely to change after a new data object is inserted into the kNN graph. Such a system is well-adapted for streaming data scenarios and scales well with high-dimensional data as well.

As described in various examples herein, incremental update of a neighbor graph via an orthogonal transform based indexing is disclosed. One example is a system including a hash transform module to apply an orthogonal transform to a data object in a data stream, and to associate the data object with a collection of ordered hash positions. An indexing module retrieves an index of ordered key positions, where each key position is indicative of data objects in the data stream that have a hash position at the key position. A neighbor determination module determines a ranked collection of neighbors for the data object in a neighbor graph, where the ranking is based on the index. A graph update module incrementally updates the neighbor graph by including the data object as a neighbor for a selected sub-plurality of data objects in the ranked collection, where the selection is based on neighborhood comparisons for the data object and data objects in the ranked collection. Such an incremental construction and update of the kNN graph of the data stream may be performed without directly computing a similarity/distance between pairs of data objects.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1:
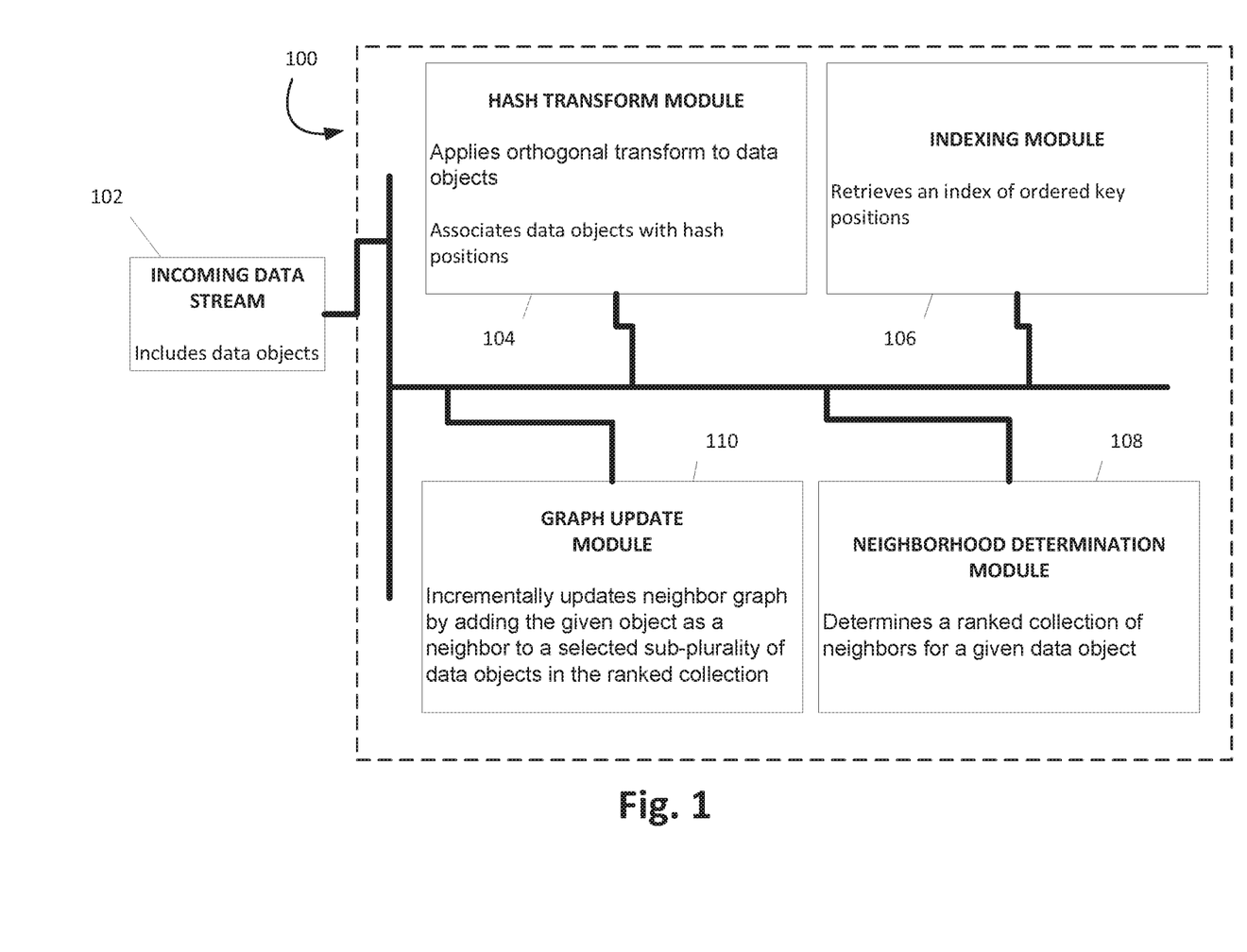
FIG. 1 is a functional block diagram illustrating one example of a system for incremental update of a neighbor graph via an orthogonal transform based indexing.

FIG. 1 is a functional block diagram illustrating one example of a system 100 for incremental update of a neighbor graph via an orthogonal transform based indexing. System 100 includes a hash transform module 104, an indexing module 106, a neighborhood determination module 108, and a graph update module 110. The hash transform module 104 may apply, via a processor, an orthogonal transform to a data object in an incoming data stream 102, and may associate the data object with a subset of U ordered hash positions.

A flow rate f for the incoming data stream 102, say S, may be measured as data objects received per second. In other words, every second, f number of data objects arrive via incoming data stream S. Accordingly, hash transforms may generally be associated at a similar rate. As described herein, hash transform module 104 may take the data object (e.g. a numerical N-dimensional vector) in the incoming data stream 102, and may associate the data object with a subset of U ordered hash positions. In some examples, the subset may have a fixed size H. A hash position generally refers to a hash symbol located at an integer from the set $\{1, 2, \ldots, U\}$, where U is generally much larger than N, and N is much larger than H. Hashes may be generally used to provide a representation of the data object. Such a hash representation may be utilized for efficient comparisons between pairs of data objects. Generally, U may be a power of 2. For example, one instance may be H=100, N=6000, and $U=2^{18}$. The H hashes may be based on largest H coefficients provided by the orthogonal transform. Accordingly, an N-dimensional object may be projected onto a lower H-dimensional object.

In some examples, the incoming data stream 102 may include a plurality of vectors with numerical, real-valued components. System 100 may be provided with values for H and U. The integer H may be experimentally determined based on the type and number of data objects in the incoming data stream 102. Generally, U is a very large integer relative to H. In one example, U is a power of 2. The elements of system 100 may be implemented, for example, in software.

In some examples, the orthogonal transform may be a Walsh-Hadamard transform ("WHT"). A WHT is an orthogonal, non-sinusoidal transform that takes a signal as input and outputs a set of basis functions. The output functions are known as Walsh functions. A Walsh function takes two values: +1 and −1. Generally, performing an orthogonal transform on the incoming data stream 102 provides a set of coefficients associated with the incoming data stream 102. For example, after application of the Walsh-Hadamard transform to the data object, the hash transform module 104 may provide a collection of coefficients $c_1, c_2, \ldots, c_k$. Alternative forms of orthogonal transforms may be utilized as well. For example, a cosine transform may be utilized.

In some examples, the H largest coefficients, $c_{n_1}, c_{n_2}, \ldots, c_{n_H}$ may be selected as the subset of hashes associated with the data object, say A. Table 1 illustrates an example association of data objects A, B, and C, with sets of hashes:

TABLE 1

| Data Term | Set of Hashes |
|---|---|
| A | {1, 5, 9, 13, 16} |
| B | {2, 3, 4, 7, 13} |
| C | {1, 5, 7, 8, 11} |

System 100 includes the indexing module 106 to retrieve, via the processor, an index of U ordered key positions, where each key position is indicative of received data objects of the incoming data stream 102 that have a hash position at the key position. Table 2 illustrates an example index with $U=2^4$ key positions $\{1, 2, \ldots, 16\}$ with data objects A, B, and C, based on sets of H=5 hashes in Table 1:

TABLE 2

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| A |   |   |   | A |   |   |   | A |   |   |   | A |   |   | A |
|   | B | B | B |   |   | B |   |   |   |   |   | B |   |   |   |
| C |   |   |   | C |   | C | C |   |   | C |   |   |   |   |   |

As illustrated, ordered key positions 1 and 5 are indicative of received data objects A and C since these data objects have hashes at the hash positions 1 and 5, as illustrated in Table 1. Likewise, ordered key position 13 is indicative of received data objects A and B since these data objects have hashes at the hash position 13, as illustrated in Table 1.

In some examples, the indexing module 106 may update the index by inserting, via the processor, a unique identifier associated with the data object into each key position of the index that corresponds to a hash position for the data object. For example, data objects B and C may have been received by system 100 prior to receiving the data object A. Accordingly, the indexing module 106 may have updated the index by inserting unique identifiers associated with the data object A. For example, the data object A may have hashes at hash positions 1, 5, 9, 13, and 16, as illustrated in Table 1. Accordingly, the indexing module 106 may update the index by inserting unique identifiers associated with the data object A at key positions 1, 5, 9, 13, and 16, as illustrated in Table 2.

A similarity measure between two data objects may be determined based on a number of common hashes. This provides an approximate measure of nearest neighbors. An approximate nearest neighbor ("ANN") search may then be performed. For example, a received data object may be mapped to a set of hashes, and this set of hashes may be utilized to search for neighbors in the incoming data stream 102 based on the similarity measure. The similarity measure may be based on a number of overlaps between respective sets of hashes, and is indicative of proximity of the pair of data objects. Table 3 illustrates an example determination of similarity measures for pairs formed from the data objects A, B, and C:

TABLE 3

| Data Object Pair: (X, Y) | Similarity Measure: S(X, Y) |
|---|---|
| (A, B) | S(A, B) = 1 |
| (A, C) | S(A, C) = 2 |
| (B, C) | S(B, C) = 1 |

As illustrated in Table 2, the data objects A and B have key position 13 in common in their respective sets of hashes. Accordingly, the similarity measure for the pair (A,B), denoted as S(A,B) may be determined to be 1. Also, for example, as illustrated in Table 2, the data objects A and C have key positions 1 and 5 in common in their respective sets of hashes. Accordingly, the similarity measure for the pair (A,C), denoted as S(A,C) may be determined to be 2. As another example, as illustrated in Table 2, the data objects B and C have key position 7 in common in their respective sets of hashes. Accordingly, the similarity measure for the pair (B,C), denoted as S(B,C) may be determined to be 1.

System 100 includes the neighborhood determination module 108 to determine, via the processor, a ranked collection of neighbors for the data object in a neighbor graph, where the ranking is based on the index. A neighbor graph, such as a kNN graph for stream S, is a time-varying directed graph where each vertex (representing an object) is connected to similar vertices. In some examples, each vertex may be connected to its top-k most similar vertices via a directed edge. For streaming data scenarios with a high flow rate, it may be desirable to construct an approximate kNN graph and update it after every data object arrival/insertion. For a flow rate of f, this may generally involve f updates per second. As described herein, in some examples, an approximate nearest neighbor list of k nearest neighbors for the data object may be maintained. Such a list may be incrementally updated with the arrival of each new data object in the incoming data stream 102.

Generally, when a new data object arrives (say n-th data object), a naïve approach may be to update all previous (n−1) lists for the (n−1) data objects received prior to the n-th data object. This may lead to $$n\frac{(n-1)}{2}$$

nearest neighbor list updates or $\vartheta(n^2)$ complexity for updating the kNN graph. This estimate does not take into account the time taken to retrieve the nearest neighbors.

In some examples, the indexing module 106 may maintain a database of ranked collections associated with data objects in the incoming data stream 102. In some examples, the ranked collection of neighbors for the data object may comprise top k nearest neighbors (e.g., based on the similarity measure) determined based on a count of overlapping hash positions in the updated index. In some examples, the ranked collection of neighbors for the data object may comprise a predetermined number of neighbors. In some examples, the ranked collection of neighbors for the data object may comprise neighbors that are approximately close to the data object. For example, neighbors may be determined to be ones that have similarity measures in the range 3 to 5. An example illustration of the ranked collection is described herein with respect to a next data object.

In some examples, the hash transform module 104 may apply a hash transform to the next data object, where the next data object is received after the data object, and the neighbor determination module 108 may determine a new ranked collection of neighbors for the next data object based on the updated index. For example, the next data object Q may be received after the data object A, which, in turn, may be received after the received data objects B and C. The hash transform module 104 may associate the next data object Q with a subset of U ordered hash positions, say {1, 5, 7, 9, 13}. Table 4 illustrates an example updated index with U=$2^4$ key positions {1, 2, 16} with data objects A, B, C, and Q:

TABLE 4

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| A |   |   |   | A |   |   |   | A |    |    |    | A  |    |    | A  |
|   | B | B | B |   |   | B |   |   |    |    |    | B  |    |    |    |
| C |   |   |   | C | C | C |   |   |    | C  |    |    |    |    |    |
| Q |   |   |   | Q |   | Q |   | Q |    |    |    | Q  |    |    |    |

Table 5 illustrates an example list of terms associated with the next data object Q illustrated in Table 4, and the corresponding similarity measures.

TABLE 5

| 1 | 5 | 6 | 7 | 9 | 10 | 13 | Similarity Measures |
|---|---|---|---|---|----|----|---------------------|
| A | A |   |   | A |    | A  | S(Q, A) = 4         |
|   |   |   | B |   | B  |    | S(Q, B) = 2         |
| C | C |   | C |   |    |    | S(Q, C) = 3         |

As illustrated, the set of hashes associated with the query term Q may be compared with the indexed data objects illustrated in Table 2. Based on such a comparison, index position 1 is indicative of a hash position associated with Q and index position 1 is also indicative of hash positions associated with data objects A and C. Also, for example, index position 5 is indicative of a hash position associated with Q, and index position 5 is also indicative of hash positions associated with data objects A and C. As another example, index position 13 is indicative of a hash position associated with Q, and index position 13 is also indicative of hash positions associated with data objects A and B. A frequency of occurrence for A may be determined to be 4. This is also the similarity measure for the pair Q and A. A frequency of occurrence for B may be determined to be 2. This is also the similarity measure for the pair Q and B. A frequency of occurrence for C may be determined to be 3. This is also the similarity measure for the pair Q and C.

As described herein, the neighbor determination module 108 may determine a new ranked collection of neighbors for the next data object based on the updated index (e.g., as illustrated in Table 4). For example, based on a similarity measure of the next data object with each data object, the neighbor determination module 108 may determine a new ranked collection of neighbors for the next data object. Based on the example illustrated in Table 5, the new ranked collection of neighbors for the next data object Q may be determined to be A, C, and B.

System 100 includes the graph update module 110 to incrementally update the neighbor graph via the processor, by including the data object as a neighbor for a selected sub-plurality of data objects in the ranked collection, where the selection is based on neighborhood comparisons for the data object and data objects in the ranked collection. The term "incremental update", as used herein, generally refers to an iterative update of the neighbor graph as data objects arrive. As described herein, such an incremental update may be based on a local determination of neighborhood relations. For example, although an incoming data object may be a nearest neighbor for a large number of previously received data objects, an appropriate sub-collection of these received data objects may be selected for an incremental update, the neighbor graph may be updated to reflect a change in neighborhoods for the selected data objects.

In some examples, the neighborhood comparisons may be based on comparisons between the ranked collection of neighbors for the data object and additional ranked collections of neighbors for data objects in the ranked collection. For example, when a data object x is received by system 100, the neighbor determination module 108 may determine a ranked collection B(x) associated with the data object X. In some examples, a collection of top-m most similar data objects (e.g., highest similarity measures with respect to the data object x) may be selected from ranked collection B(x), say $x_1, x_2, \ldots, x_m$. In some examples, each of these data objects may be associated with respective additional ranked collections, $B(x_1), B(x_2), \ldots, B(x_m)$.

In some examples, the additional ranked collection $B(x_1)$ corresponding to the data object $x_1$ may comprise neighbor $x_{11}, x_{12}, \ldots, x_{1k}$, where $x_{11}$ is closest to $x_1$, and $x_{1k}$ is the k-th furthest away from $x_1$. A notion of distance-based terms "close" and "further", as used herein, may be defined quantitatively with respect to, for example, the similarity measures determined herein. For example, two data objects that have a larger count of overlapping hashes (e.g., a larger similarity measure) may be determined to be closer than two data objects that have a smaller count of overlapping hashes (e.g., a smaller similarity measure). For example, with reference to Table 3, the data objects A and C are closer (with similarity measure 2) than the data objects A and B(with similarity measure 1).

Accordingly, the graph update module 110 may compare the distance from $x_1$ to the data object in $B(x_1)$ that is furthest away from $x_1$, for example, $x_{1k}$, with the distance from $x_1$ to x. If the distance from $x_1$ to x is less than the distance from $x_1$ to $x_{1k}$, then the graph update module 110 may incrementally update the neighbor graph to include x in the ranked collection $B(x_1)$ corresponding to the data object $x_1$, and add x as a neighbor for $x_1$. In some examples, the graph update module 110 may perform such a comparison for each data object in $B(x_1)$. Accordingly, an updated ranked collection may be determined for $x_1$.

In some examples, the graph update module 110 may repeat, concurrently, and/or iteratively, the process described with reference to $B(x_1)$ for each of the top-m data objects $x_1$, $x_2, \ldots, x_m$ in the ranked collection B(x) associated with the data object x. The number of neighbor comparisons may be further reduced by using a search algorithm (e.g., a binary search) and/or an efficient data structure to store the neighbor graph, the index, and/or the ranked collections for each data object.

A critical parameter for the process, as described herein, is the parameter m, corresponding to the top-m data objects $x_1, x_2, \ldots, x_m$ in the ranked collection B(x). In some examples, a value for the parameter m may be determined by experimenting with an accuracy of incremental update of neighbor graphs determined based on different values of the parameter m.

As described herein, the incremental update process does not compute distances and/or similarity measures between every possible pairs of potential and/or actual neighbors. In terms of computational complexity based on a number of operations performed, the complexity of this incremental update process may be approximately determined as $\vartheta(mn)$, as compared to a complexity of $\vartheta(n^2)$ to update the entire kNN graph. Generally, a cost of a single operation may be less expensive than existing approaches that directly compare all or a subset of the data points. The process described herein does not depend on a dimensionality of x, thereby enhancing run-time efficiencies.

In some examples, the graph update module 110 may provide, via the processor to a computing device, an incrementally updated computer generated visual rendition of the neighbor graph for the incoming data stream 102. For example, as each data object is received by system 100 and processed as described herein, the graph update module 110 may retrieve the updated ranked collections, and display the data objects in the neighbor graph by adding nodes for the data objects, and by adding vertices between data objects to indicate updated neighbor relations between data objects. For example, when the data object x is added to the ranked collection $B(x_1)$ for $x_1$ via removal of a previous neighbor $x_{1k}$, the graph update module 110 may generate an incrementally updated visual rendition of the neighbor graph by adding a node representing x to the neighbor graph, and by adding an edge between x and $x_1$, indicative of an addition of x as a neighbor for $x_1$. Also, for example, the graph update module 110 may generate an incrementally updated visual rendition of the neighbor graph by removing an edge between $x_{1k}$ and $x_1$, indicative of a deletion of $x_{1k}$ as a neighbor for $x_1$.

The components of system 100 may be computing resources, each including a suitable combination of a physical computing device, a virtual computing device, a network, software, a cloud infrastructure, a hybrid cloud infrastructure that may include a first cloud infrastructure and a second cloud infrastructure that is different from the first cloud infrastructure, and so forth. The components of system 100 may be a combination of hardware and programming for performing a designated visualization function. In some instances, each component may include a processor and a memory, while programming code is stored on that memory and executable by a processor to perform a designated function.

For example, the hash transform module 104 is a combination of hardware and programming to apply the orthogonal transform to the data objects in the incoming data stream 102 via the processor. Also, for example, the hash transform module 104 may include software programming to generate the hash positions for the data objects, and may be communicatively linked to a hardware storage server, and/or a cloud server to store the hash positions for the data objects.

Likewise, the indexing module 106 is a combination of hardware and programming to retrieve, via the processor, the index of U ordered key positions. For example, the indexing module 106 may include software programming to automatically update the index by inserting, via the processor, unique identifiers associated with each data object into each key positions of the index that correspond to hash positions for the data object. Also, for example, the indexing module 106 may include hardware to physically store, for example, the updated index. Also, for example, the indexing module 106 may include a combination of hardware and software programming to dynamically interact with the other components of system 100.

In like manner, the neighborhood determination module 108 is a combination of hardware and programming. For example, the neighborhood determination module 108 may include software programming instructions to determine the ranked collections of neighbors for the data objects. Also, for example, the neighborhood determination module 108 may include hardware to physically store, for example, the ranked collections. The neighborhood determination module 108 may include a combination of hardware and software programming to dynamically interact with the other components of system 100.

Also, for example, the graph update module 110 is a combination of hardware and programming. For example, the graph update module 110 may include software programming instructions to update the neighbor graph, and may include hardware to physically store, for example, the updated neighbor graph. As another example, the graph update module 110 may include software programming instructions to generate an incrementally updated computer generated visual rendition of the neighbor graph, and may include hardware to physically display the visual rendition of the neighbor graph. The graph update module 110 may include a combination of hardware and software programming to dynamically interact with the other components of system 100.

Generally, as described herein, the components of system 100 may include software programming and physical networks to be communicatively linked to other components of system 100. In some instances, the components of system 100 may include a processor and a memory, while programming code is stored and on that memory and executable by a processor to perform designated functions.

A computing device, as used herein, may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. The computing device may include a processor and a computer-readable storage medium.

Figure 2:
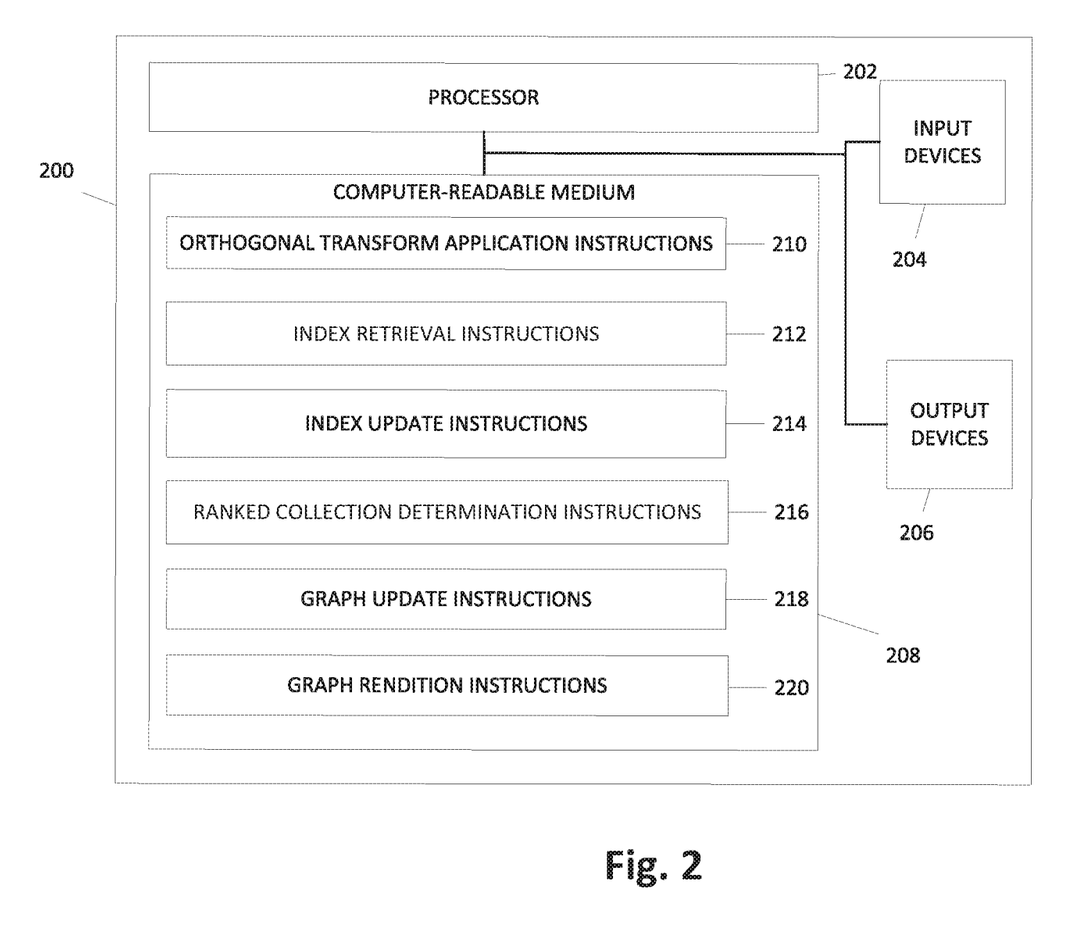
FIG. 2 is a block diagram illustrating one example of a computer readable medium for incremental update of a neighbor graph via an orthogonal transform based indexing.

FIG. 2 is a block diagram illustrating one example of a computer readable medium for incremental update of a neighbor graph via an orthogonal transform based indexing. Processing system 200 includes a processor 202, a computer readable medium 208, input devices 204, and output devices 206. Processor 202, computer readable medium 208, input devices 204, and output devices 206 are coupled to each other through a communication link (e.g., a bus).

Processor 202 executes instructions included in the computer readable medium 208. Computer readable medium 208 includes orthogonal transform application instructions 210 to apply, via a processor, an orthogonal transform to a data object in an incoming data stream 102, and associating the data object with a subset of U ordered hash positions.

Computer readable medium 208 includes index retrieval instructions 212 to retrieve, via the processor, an index of U ordered key positions, wherein each key position is indicative of received data objects of the incoming data stream 102 that have a hash position at the key position.

Computer readable medium 208 includes index update instructions 214 to update the index by inserting, via the processor, a unique identifier associated with the data object into each key position of the index that corresponds to a hash position for the data object.

Computer readable medium 208 includes ranked collection determination instructions 216 to determine, via the processor, a ranked collection of neighbors for the data object in a neighbor graph, wherein the ranking is based on the updated index.

Computer readable medium 208 includes graph update instructions 218 to incrementally update the neighbor graph via the processor, by including the data object as a neighbor for a selected sub-plurality of data objects in the ranked collection, wherein the selection is based on neighborhood comparisons for the data object and data objects in the ranked collection.

Computer readable medium 208 includes graph rendition instructions 220 to provide, via the processor to a computing device, an incrementally updated computer generated visual rendition of the neighbor graph for the incoming data stream 102.

In some examples, computer readable medium 208 includes instructions to maintain an incrementally updated database of ranked collections of neighbors for data objects in the incoming data stream 102.

Input devices 204 include a keyboard, mouse, data ports, and/or other suitable devices for inputting information into processing system 200. In some examples, input devices 204, such as a computing device, are used to receive the incoming data stream 102. Output devices 206 include a monitor, speakers, data ports, and/or other suitable devices for outputting information from processing system 200. In some examples, output devices 206 are used to provide the incrementally updated computer generated visual rendition of the neighbor graph for the incoming data stream 102.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g.; a hard drive); a solid state drive, and the like, or a combination thereof. For example, the computer readable medium 208 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed; floppy and removable disks; other magnetic media including tape; optical media such as compact disks (CDs) or digital video disks (DVDs); or other types of storage devices.

As described herein, various components of the processing system 200 are identified and refer to a combination of hardware and programming configured to perform a designated visualization function. As illustrated in FIG. 2, the programming may be processor executable instructions stored on tangible computer readable medium 208, and the hardware may include processor 202 for executing those instructions. Thus, computer readable medium 208 may store program instructions that, when executed by processor 202, implement the various components of the processing system 200.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 208 may be any of a number of memory components capable of storing instructions that can be executed by Processor 202. Computer readable medium 208 may be non-transitory in the sense that it does not encompass a transitory signal but instead is made up of one or more memory components configured to store the relevant instructions. Computer readable medium 208 may be implemented in a single device or distributed across devices. Likewise, processor 202 represents any number of processors capable of executing instructions stored by computer readable medium 208. Processor 202 may be integrated in a single device or distributed across devices. Further, computer readable medium 208 may be fully or partially integrated in the same device as processor 202 (as illustrated), or it may be separate but accessible to that device and processor 202. In some examples, computer readable medium 208 may be a machine-readable storage medium.

Figure 3:
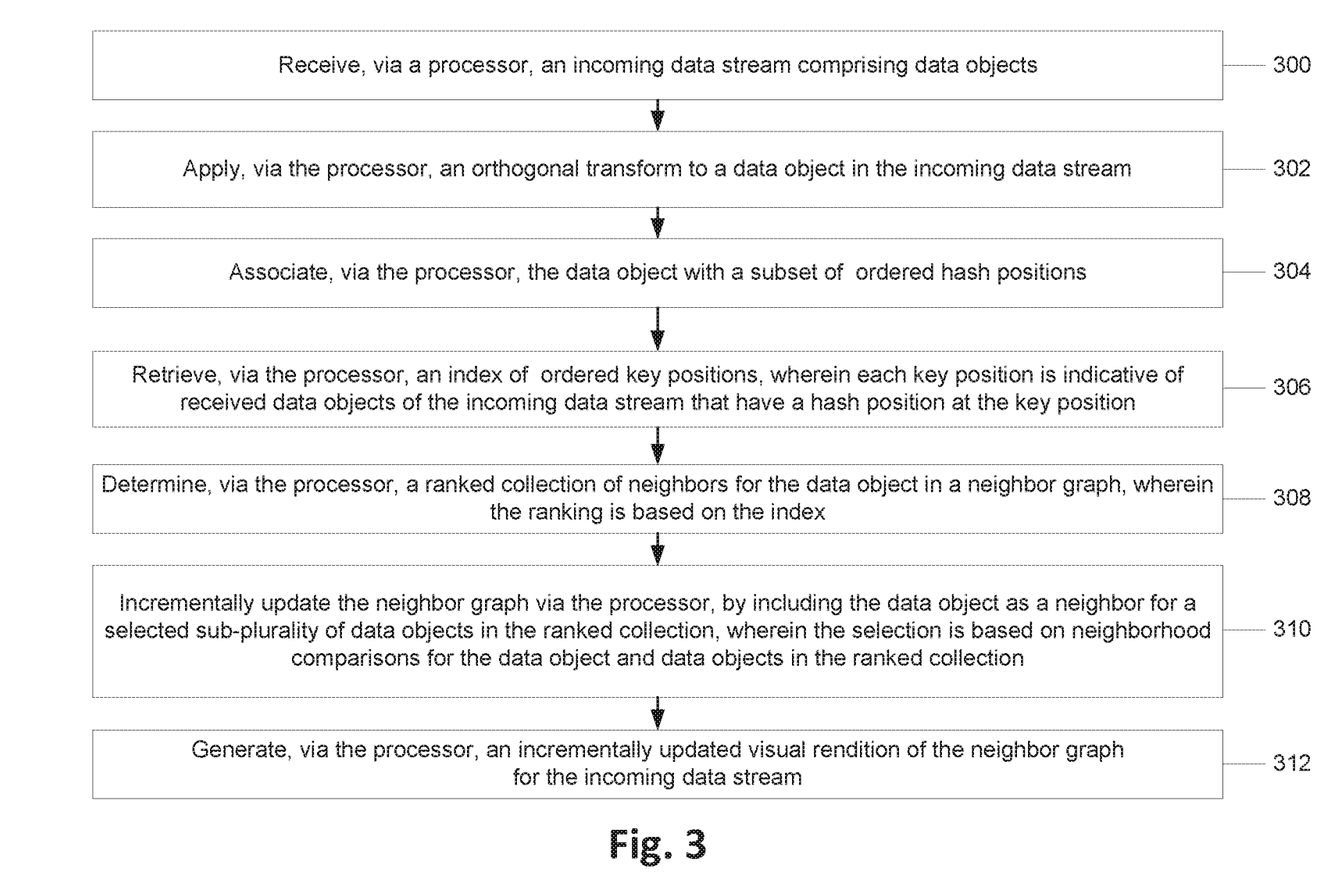
FIG. 3 is a flow diagram illustrating one example of a method for incremental update of a neighbor graph via an orthogonal transform based indexing.

FIG. 3 is a flow diagram illustrating one example of a method for incremental update of a neighbor graph via an orthogonal transform based indexing. In some examples, such an example method may be implemented by a system such as, for example, system 100 of FIG. 1.

At 300, an incoming data stream 102 comprising data objects is received via a processor.

At 302, an orthogonal transform is applied to a data object in the incoming data stream 102.

At 304, the data object is associated with a subset of U ordered hash positions.

At 306, an index of U ordered key positions is retrieved via the processor, where each key position is indicative of received data objects of the incoming data stream 102 that have a hash position at the key position.

At 308, a ranked collection of neighbors is determined for the data object in a neighbor graph, wherein the ranking is based on the index.

At 310, the neighbor graph is incrementally updated via the processor, by including the data object as a neighbor for a selected sub-plurality of data objects in the ranked collection, where the selection is based on neighborhood comparisons for the data object and data objects in the ranked collection.

At 312, an incrementally updated visual rendition of the neighbor graph is generated for the incoming data stream 102.

Figure 4:
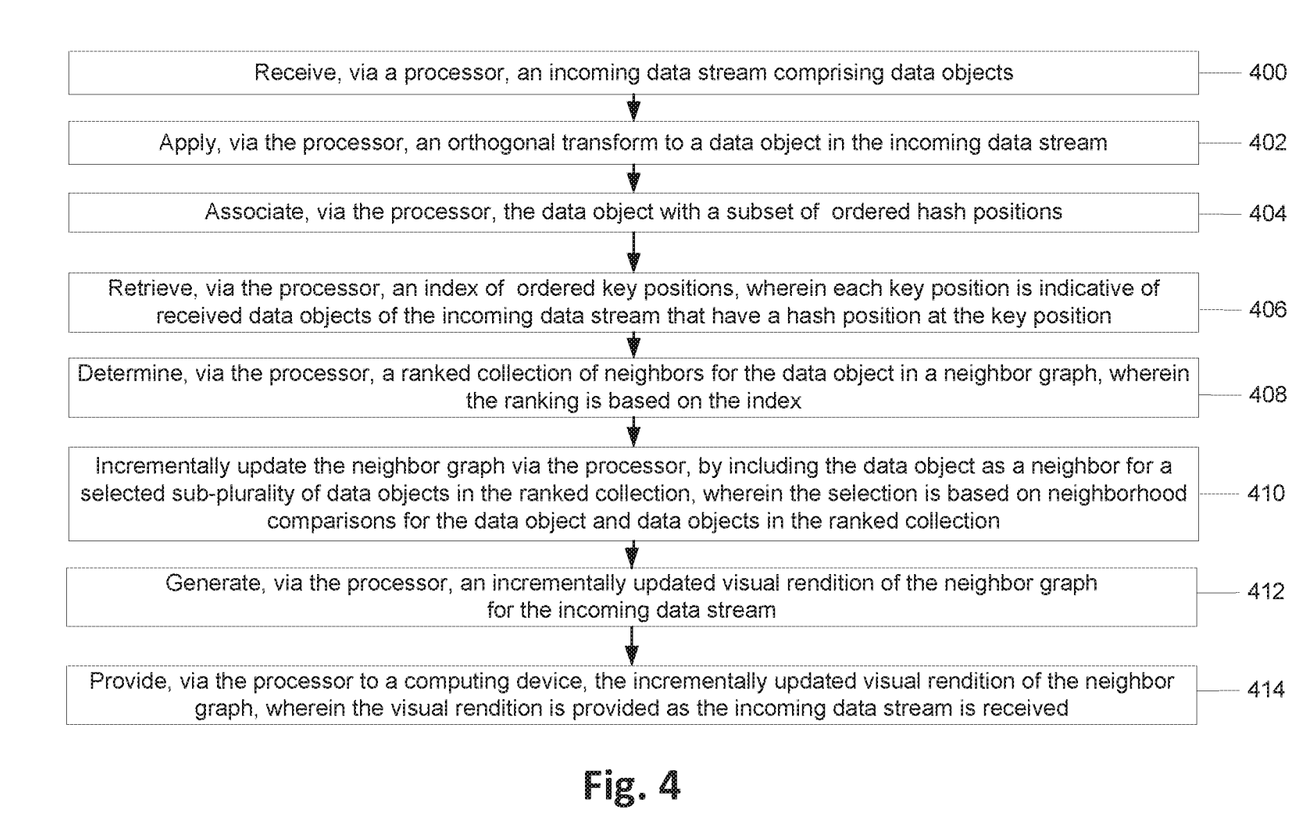
FIG. 4 is a flow diagram illustrating one example of a method for providing an incremental update of a neighbor graph via an orthogonal transform based indexing.

FIG. 4 is a flow diagram illustrating one example of a method for providing an incremental update of a neighbor graph via an orthogonal transform based indexing.

At 400, an incoming data stream 102 comprising data objects is received via a processor.

At 402, an orthogonal transform is applied to a data object in the incoming data stream 102.

At 404, the data object is associated with a subset of U ordered hash positions.

At 406, an index of U ordered key positions is retrieved via the processor, where each key position is indicative of received data objects of the incoming data stream 102 that have a hash position at the key position.

At 408, a ranked collection of neighbors is determined for the data object in a neighbor graph, wherein the ranking is based on the index.

At 410, the neighbor graph is incrementally updated via the processor, by including the data object as a neighbor for a selected sub-plurality of data objects in the ranked collection, where the selection is based on neighborhood comparisons for the data object and data objects in the ranked collection.

At 412, an incrementally updated visual rendition of the neighbor graph is generated for the incoming data stream 102.

At 414, the incrementally updated visual rendition of the neighbor graph is provided to a computing device via the processor, where the visual rendition is provided as the incoming data stream is received.

Figure 5:
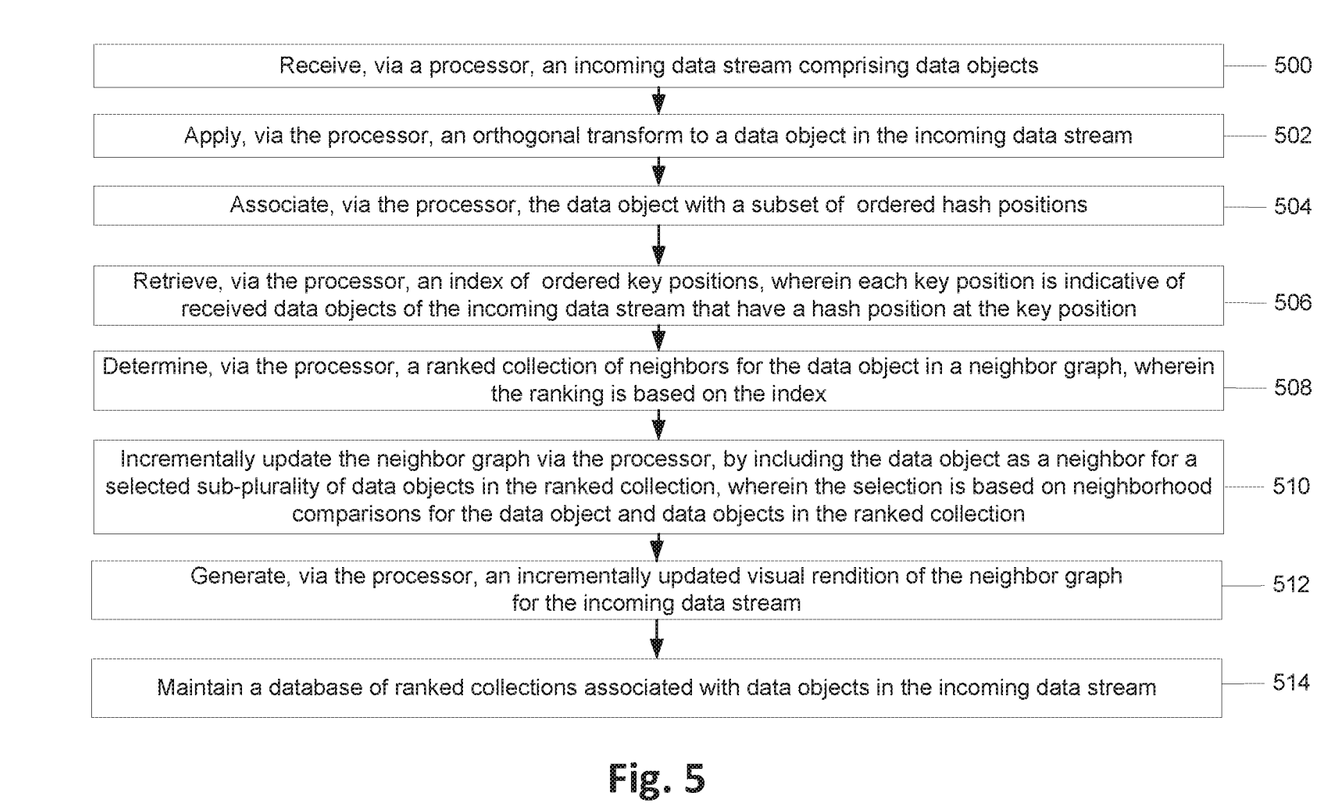
FIG. 5 is a flow diagram illustrating one example of a method for maintaining a database of ranked collections for an incremental update of a neighbor graph via an orthogonal transform based indexing.

FIG. 5 is a flow diagram illustrating one example of a method for maintaining a database of ranked collections for an incremental update of a neighbor graph via an orthogonal transform based indexing.

At 500, an incoming data stream 102 comprising data objects is received via a processor.

At 502, an orthogonal transform is applied to a data object in the incoming data stream 102.

At 504, the data object is associated with a subset of U ordered hash positions.

At 506, an index of U ordered key positions is retrieved via the processor, where each key position is indicative of received data objects of the incoming data stream 102 that have a hash position at the key position.

At 508, a ranked collection of neighbors is determined for the data object in a neighbor graph, wherein the ranking is based on the index.

At 510, the neighbor graph is incrementally updated via the processor, by including the data object as a neighbor for a selected sub-plurality of data objects in the ranked collection, where the selection is based on neighborhood comparisons for the data object and data objects in the ranked collection.

At 512, an incrementally updated visual rendition of the neighbor graph is generated for the incoming data stream 102.

At 514, a database of ranked collections associated with data objects in the incoming data stream 102 is maintained.

Figure 6:
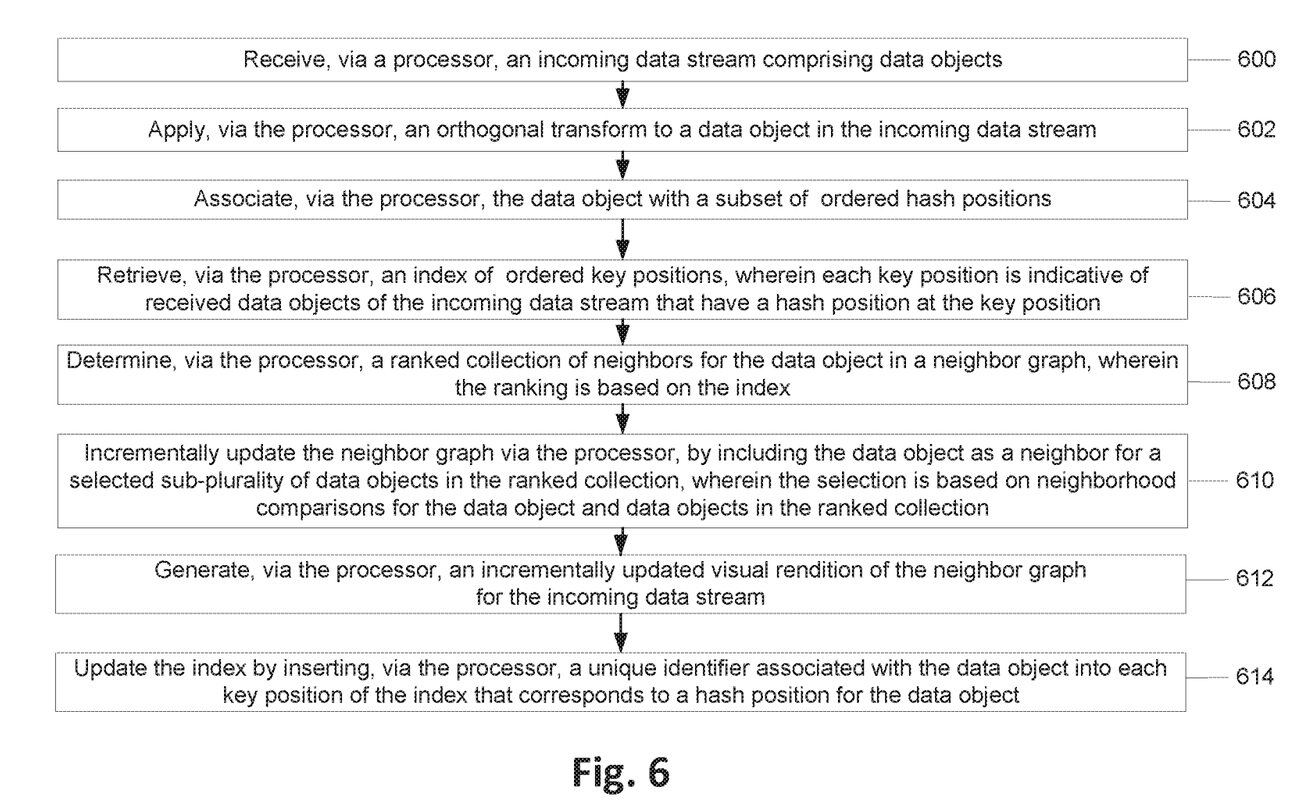
FIG. 6 is a flow diagram illustrating one example of a method an index for an incremental update of a neighbor graph via an orthogonal transform based indexing.

FIG. 6 is a flow diagram illustrating one example of a method an index for an incremental update of a neighbor graph via an orthogonal transform based indexing.

At 600, an incoming data stream 102 comprising data objects is received via a processor.

At 602, an orthogonal transform is applied to a data object in the incoming data stream 102.

At 604, the data object is associated with a subset of U ordered hash positions.

At 606, an index of U ordered key positions is retrieved via the processor, where each key position is indicative of received data objects of the incoming data stream 102 that have a hash position at the key position.

At 608, a ranked collection of neighbors is determined for the data object in a neighbor graph, wherein the ranking is based on the index.

At 610, the neighbor graph is incrementally updated via the processor, by including the data object as a neighbor for a selected sub-plurality of data objects in the ranked collection, where the selection is based on neighborhood comparisons for the data object and data objects in the ranked collection.

At 612, an incrementally updated visual rendition of the neighbor graph is generated for the incoming data stream 102.

At 614, the index is updated by inserting, via the processor, a unique identifier associated with the data object into each key position of the index that corresponds to a hash position for the data object.

Examples of the disclosure provide a generalized system for incremental update of a neighbor graph via an orthogonal transform based indexing. The generalized system addresses business challenges of growing costs incurred in data storage, analytic processing and data communications, when data volumes are disproportionately high compared to utility in generating valuable insight. The key proposition is to keep an approximate nearest neighbor list of size k for each previously received data object after the arrival of every new data object in an incoming data stream, without directly computing the similarity/distance between any pairs of data objects. This is generally achieved by maintaining an incrementally updated index, and dynamically updated ranked collections of neighbors for each data object.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system for processing a big data set that exceeds a processing capacity of a second system that is absent a graphing technique, the system comprising:

a hash transform module to apply, via a processor, an orthogonal transform to a data object in an incoming data stream, the incoming data stream comprising data exceeding processing capacity of the second system, wherein the second system is absent the graphing technique;

the hash transform module, to associate, via the processor, the data object with a subset of ordered hash positions;

an indexing module to retrieve, via the processor, an index of ordered key positions, wherein each key position is indicative of received data objects of the incoming data stream that have a hash position at the key position, and wherein the indexing module includes computer hardware to physically store the index of ordered key positions;

a neighbor determination module to determine, via the processor, a ranked collection of neighbors for the data object in a neighbor graph, wherein the ranking is based on the index;

a graph update module to incrementally update the neighbor graph via the processor, by including the data object as a neighbor for a selected sub-plurality of data objects in the ranked collection, wherein the selection is based on neighborhood comparisons for the data object and the data objects in the ranked collection; and generate, by the processor, an incrementally updated visual rendition of the neighbor graph for the incoming data stream, wherein the processor is continually analyzing the big data set or the incoming data stream in generating the incrementally updated visual rendition of the neighbor graph.

2. The system of claim 1, wherein the graph update module is to provide, via the processor to a computing device, the incrementally updated visual rendition of the neighbor graph for the incoming data stream.

3. The system of claim 1, wherein the neighborhood comparisons are based on comparisons between the ranked collection of neighbors for the data object and additional ranked collections of neighbors for the data objects in the ranked collection.

4. The system of claim 1, wherein the indexing module is to update the index by inserting, via the processor, a unique identifier associated with the data object into each key position of the index that corresponds to a hash position for the data object.

5. The system of claim 4, wherein the ranked collection of neighbors for the data object comprises a number of top nearest neighbors determined based on a count of overlapping hash positions in the updated index.

6. The system of claim 4, wherein the hash transform module is to apply a hash transform to a next data object, wherein the next data object is received after the data object, and the neighbor determination module is to determine a new ranked collection of neighbors for the next data object based on the updated index.

7. A method for processing a big data set that exceeds a processing capacity of a second system that is absent a graphing technique, the method comprising:

receiving, via a processor, an incoming data stream comprising data objects;

applying, via the processor, an orthogonal transform to a data object in the incoming data stream, the incoming data stream comprising at least a portion of data exceeding processing capacity of the second system, wherein the second system is absent the graphing technique;

associating, via the processor, the data object with a subset of ordered hash positions;

retrieving, via the processor, an index of ordered key positions, wherein each key position is indicative of the received data objects of the incoming data stream that have a hash position at the key position;

determining, via the processor, a ranked collection of neighbors for the data object in a neighbor graph, wherein the ranking is based on the index;

incrementally updating the neighbor graph via the processor, by including the data object as a neighbor for a selected sub-plurality of data objects in the ranked collection, wherein the selection is based on neighborhood comparisons for the data object and the data objects in the ranked collection; and upon continually analyzing the big data set, generating, via the processor, an incrementally updated visual rendition of the neighbor graph for the incoming data stream.

8. The method of claim 7, further comprising providing, via the processor to a computing device, the incrementally updated visual rendition of the neighbor graph, wherein the incrementally updated visual rendition is provided as the incoming data stream is received.

9. The method of claim 7, wherein the neighborhood comparisons are based on comparisons between the ranked collection of neighbors for the data object and additional ranked collections of neighbors for the data objects in the ranked collection.

10. The method of claim 7, further comprising maintaining a database of ranked collections associated with the data objects of the incoming data stream.

11. The method of claim 7, further comprising updating the index by inserting, via the processor, a unique identifier associated with the data object into each key position of the index that corresponds to a hash position for the data object.

12. The method of claim 11, wherein the ranked collection of neighbors for the data object comprises a number of top nearest neighbors determined based on a count of overlapping hash positions in the updated index.

13. A non-transitory computer readable medium for processing a big data set that exceeds a processing capacity of a second system that is absent a graphing technique, the non-transitory computer readable medium comprising executable instructions to:

apply, via a processor, an orthogonal transform to a data object in an incoming data stream, and associating the data object with a subset of ordered hash positions, the incoming data stream comprising at least a portion of data exceeding processing capacity of a second system, wherein the second system is absent the graphing technique;

retrieve, via the processor, an index of ordered key positions, wherein each key position is indicative of received data objects of the incoming data stream that have a hash position at the key position;

update the index by inserting, via the processor, a unique identifier associated with the data object into each key position of the index that corresponds to a hash position for the data object;

determine, via the processor, a ranked collection of neighbors for the data object in a neighbor graph, wherein the ranking is based on the updated index;

incrementally update the neighbor graph via the processor, by including the data object as a neighbor for a selected sub-plurality of data objects in the ranked collection, wherein the selection is based on neighborhood comparisons for the data object and the data objects in the ranked collection; and upon continually analyzing the big data set, provide, via the processor to a computing device, an incrementally updated computer generated visual rendition of the neighbor graph for the incoming data stream, wherein the processor is continually analyzing the big data set or the incoming data stream in generating the incrementally updated computer generated visual rendition of the neighbor graph, and wherein the non-transitory computer readable medium is distributed across a plurality of devices.

14. The non-transitory computer readable medium of claim 13, further comprising instructions to maintain an incrementally updated database of ranked collections of neighbors for the data objects of the incoming data stream.

15. The non-transitory computer readable medium of claim 13, wherein the neighborhood comparisons are based on comparisons between the ranked collection of neighbors for the data object and additional ranked collections of neighbors for the data objects in the ranked collection.

16. The non-transitory computer readable medium of claim 13, wherein the indexing module is to update the index by inserting, via the processor, a unique identifier associated with the data object into each key position of the index that corresponds to a hash position for the data object.

17. The non-transitory computer readable medium of claim 16, wherein the ranked collection of neighbors for the data object comprises a number of top nearest neighbors determined based on a count of overlapping hash positions in the updated index.

18. The non-transitory computer readable medium of claim 16, wherein the hash transform module is to apply a hash transform to a next data object, wherein the next data object is received after the data object, and the neighbor determination module is to determine a new ranked collection of neighbors for the next data object based on the updated index.

* * * * *